US009262684B2

(12) United States Patent
Tico et al.

(10) Patent No.: US 9,262,684 B2
(45) Date of Patent: Feb. 16, 2016

(54) METHODS OF IMAGE FUSION FOR IMAGE STABILIZATION

(71) Applicant: Apple Inc., Cupertino, CA (US)

(72) Inventors: Marius Tico, Mountain View, CA (US); Jianping Zhou, Fremont, CA (US); Anita Nariani Schulze, Los Altos, CA (US); Rolf Toft, Palo Alto, CA (US); Paul Hubel, Mountain View, CA (US); Wei Sun, San Jose, CA (US)

(73) Assignee: Apple Inc., Cupertino, CA (US)

( * ) Notice: Subject to any disclaimer, the term of this patent is extended or adjusted under 35 U.S.C. 154(b) by 295 days.

(21) Appl. No.: 13/911,740

(22) Filed: Jun. 6, 2013

(65) Prior Publication Data

US 2014/0363087 A1     Dec. 11, 2014

(51) Int. Cl.
| G06T 1/00 | (2006.01) |
| G06K 9/46 | (2006.01) |
| G06K 9/62 | (2006.01) |
| G06T 5/00 | (2006.01) |
| G06T 5/10 | (2006.01) |
| H04N 5/232 | (2006.01) |

(52) U.S. Cl.
CPC ............... *G06K 9/46* (2013.01); *G06K 9/6201* (2013.01); *G06T 5/003* (2013.01); *G06T 5/10* (2013.01); *G06T 2207/10016* (2013.01); *G06T 2207/10144* (2013.01); *G06T 2207/20016* (2013.01); *G06T 2207/20201* (2013.01); *G06T 2207/20208* (2013.01); *G06T 2207/20221* (2013.01); *H04N 5/23267* (2013.01)

(58) Field of Classification Search
None
See application file for complete search history.

(56) References Cited

U.S. PATENT DOCUMENTS

| 5,646,521 | A  |   | 7/1997  | Rosenthal |
| 5,920,657 | A  |   | 7/1999  | Bender |
| 6,271,847 | B1 | * | 8/2001  | Shum et al. .................. 345/418 |
| 6,301,440 | B1 |   | 10/2001 | Bolle |
| 6,552,744 | B2 |   | 4/2003  | Chen |

(Continued)

FOREIGN PATENT DOCUMENTS

WO     WO 0013407     *   3/2000   ............... G06T 3/00

OTHER PUBLICATIONS

Madiha Hussain Malik, et al.: "Wavelet Based Exposure Fusion," Lecture Notes in Engineering and Computer Science, Jul. 2, 2008, pp. 688-693, XP055132823, Retrieved from the Internet: URL: http://www.iaeng.org/publication/WCE2008/WCE2008_pp688-693.pdf [retrieved on Jul. 31, 2014].

(Continued)

*Primary Examiner* — Andrew G Yang
(74) *Attorney, Agent, or Firm* — Blank Rome LLP

(57) ABSTRACT

Systems, methods, and computer readable media to improve image stabilization operations are described. Novel approaches for fusing non-reference images with a pre-selected reference frame in a set of commonly captured images are disclosed. The fusing approach may use a soft transition by using a weighted average for ghost/non-ghost pixels to avoid sudden transition between neighborhood and almost similar pixels. Additionally, the ghost/non-ghost decision can be made based on a set of neighboring pixels rather than independently for each pixel. An alternative approach may involve performing a multi-resolution decomposition of all the captured images, using temporal fusion, spatio-temporal fusion, or combinations thereof, at each level and combining the different levels to generate an output image.

20 Claims, 11 Drawing Sheets

(56) References Cited

U.S. PATENT DOCUMENTS

| | | | |
|---|---|---|---|
| 7,130,864 B2 | 10/2006 | Lin | |
| 7,424,218 B2 | 9/2008 | Baudisch | |
| 7,602,418 B2 | 10/2009 | Border | |
| 7,688,379 B2 | 3/2010 | Forman | |
| 7,742,083 B2 | 6/2010 | Fredlund | |
| 7,839,429 B2 | 11/2010 | Williams | |
| 7,856,120 B2 | 12/2010 | Porikli | |
| 7,929,853 B2 | 4/2011 | Park | |
| 7,991,196 B2 | 8/2011 | Tener | |
| 8,018,999 B2 | 9/2011 | Yao | |
| 8,023,000 B2 | 9/2011 | Tamaru | |
| 8,189,051 B2 | 5/2012 | Shih | |
| 8,335,400 B2 | 12/2012 | Kobayashi | |
| 8,699,822 B2 | 4/2014 | Park | |
| 2005/0228849 A1 | 10/2005 | Zhang | |
| 2006/0210166 A1 | 9/2006 | Takemoto | |
| 2007/0182861 A1 | 8/2007 | Luo | |
| 2008/0037869 A1 | 2/2008 | Zhou | |
| 2008/0166115 A1 | 7/2008 | Sachs | |
| 2008/0170126 A1 | 7/2008 | Tico | |
| 2008/0192129 A1 | 8/2008 | Walker | |
| 2009/0115859 A1 | 5/2009 | Lee | |
| 2009/0161982 A1 | 6/2009 | Tico | |
| 2009/0169102 A1* | 7/2009 | Zhang et al. | 382/167 |
| 2009/0263028 A1 | 10/2009 | Kwon | |
| 2010/0017115 A1 | 1/2010 | Gautama | |
| 2010/0020224 A1 | 1/2010 | Hattori | |
| 2010/0053346 A1 | 3/2010 | Mitsunaga | |
| 2010/0165122 A1 | 7/2010 | Castorina | |
| 2010/0183225 A1* | 7/2010 | Vantaram et al. | 382/173 |
| 2010/0231593 A1 | 9/2010 | Zhou | |
| 2010/0271512 A1 | 10/2010 | Garten | |
| 2010/0277609 A1 | 11/2010 | Abe | |
| 2011/0038548 A1 | 2/2011 | Rezazadeh | |
| 2011/0311147 A1 | 12/2011 | Pahalawatta | |
| 2012/0069203 A1 | 3/2012 | Voss | |
| 2012/0076427 A1 | 3/2012 | Hibino | |
| 2012/0082389 A1 | 4/2012 | Sakamoto | |
| 2012/0120283 A1 | 5/2012 | Capata | |
| 2012/0121202 A1 | 5/2012 | Wang | |
| 2012/0183202 A1 | 7/2012 | Wei | |
| 2012/0201427 A1 | 8/2012 | Jasinski | |
| 2012/0218427 A1 | 8/2012 | Wu | |
| 2012/0249826 A1 | 10/2012 | Kobayashi | |
| 2012/0281924 A1 | 11/2012 | Coulombe | |
| 2012/0281969 A1 | 11/2012 | Jiang | |
| 2012/0293607 A1 | 11/2012 | Bhogal | |
| 2012/0300023 A1 | 11/2012 | Lee | |
| 2013/0028509 A1 | 1/2013 | Moon | |
| 2013/0265451 A1 | 10/2013 | Son | |
| 2014/0071299 A1 | 3/2014 | Grundmann | |

OTHER PUBLICATIONS

Tico, M. et al.: "Robust Method of Digital Image Stabilization," 3rd International Symposium on Communications, Control and Signal Processing, 2008. ISCCSP 2008, IEEE, Piscataway, NJ, USA, Mar. 12, 2008, pp. 316-321, XP031269886, ISBN: 978-1-244-1687-5.

Luo, Yiwen, and Xiaoou Tang, "Photo and video quality evaluation: Focusing on the subject." Computer Vision—ECCV 2008. Springer Berlin Heidelberg, 2008, 386-399.

Yousefi, Siamak, M. Rahman, and Nasser Kehtarnavaz, "A new autofocus sharpness function for digital and smart-phone cameras." Consumer Electronics, IEEE Transactions on 57.3 (2011): 1003-1009.

International Search Report and Written Opinion for Internationa Application No. PCT/US2014/052965, dated Nov. 20, 2014.

* cited by examiner

METHODS OF IMAGE FUSION FOR IMAGE STABILIZATION

BACKGROUND

This disclosure relates generally to the field of digital photography. More particularly, but not by way of limitation, this disclosure relates to still image stabilization techniques. As used herein, image stabilization refers to a collection of techniques for reducing motion-induced blurring during image capture operations. Such motion may result from the movement of the camera, objects in the scene, or both.

Taking high quality photographs in low ambient light conditions, or photographing dynamic scenes (e.g., sport scenes) is challenging due to camera motion and/or the motion of objects within a scene during image capture. One way to reduce motion blur without amplifying an image's noise is to capture and fuse multiple short exposed images of the scene. Such operations are often called 'Still Image Stabilization.' While shortening image exposure times can reduce motion blur artifacts, it does so at the expense of a noisier and/or darker image.

A common approach to image stabilization consists of (1) selecting a reference image from a set of multiple short exposed images, (2) globally registering all non-reference images with respect to the reference image, and (3) synthesizing an output image by fusing all captured images to the reference image. In this way the output image represents the scene as it was at the time the reference image was captured, where non-reference images are used to reduce the noise in the reference image by averaging/merging multiple observations of each reference pixel across all images.

A common approach to synthesizing an output image by fusing all registered non-reference images to the reference image is to directly average the images. Direct averaging would reduce the noise in the static areas of the image, but it would also introduce ghosting artifacts. Ghosting artifacts often occur when some of the pixels in the reference image are occluded in some of the non-reference images due to moving objects in the scene. When there is motion between the captured images, significant ghosting artifact can be present in the final output when the images are directly averaged. An example of the effects of such ghosting artifacts is shown in FIG. 1. FIG. 1 shows the resulting output of directly averaging globally registered images. As can be seen from FIG. 1, there are significant ghosting artifacts when images are directly averaged.

One way to avoid ghosting artifacts is for the fusion procedure to distinguish between occlusion and noise and to exclude from fusion all the occluded areas. That can be achieved by excluding from the averaging all non-reference pixels that have very different values in comparison with their corresponding reference pixels. One way to determine the amount of acceptable difference is to calculate it based on the expected noise in a particular pixel. Once the acceptance threshold has been determined, non-reference pixels that differ more than this threshold from their corresponding reference pixels may be excluded from the averaging.

Using a set threshold for ghosting/non-ghosting pixel classification may itself, however, result in image artifacts, particularly in the presence of heavy noise, which may be a typical case for image stabilization. That is because the acceptance threshold is a statistical estimate that may have a certain rate of failure. Neighborhood pixels may easily fall on one side or the other of the threshold, thus creating sudden transitions between ghosting/non-ghosting (i.e. noisier/cleaner) pixels. Thus, currently used fusion methods can be improved.

SUMMARY

In one embodiment a method to fuse a captured reference image with a captured non-reference image is provided. The method includes obtaining a first image of a scene captured at a first time, where the image has a plurality of pixels, and obtaining a second image of the scene at a second time, where each of the plurality of pixels in the first image has a corresponding pixel in the second image. The method can then involve selecting a first pixel from the first image and determining a non-binary weight value for the first pixel's corresponding pixel in the second image. The first pixel may then be combined with it's corresponding pixel from the second image using the non-binary weight value to obtain a first fused pixel. The process can be repeated to select, determine and combine for each of the plurality of other pixels in the first image to obtain a fused image.

In another embodiment, an alternative method for fusing a captured reference image with a captured non-reference image is provided. A method in accordance with this approach includes obtaining a first image of a scene captured at a first time, where the first image has a plurality of pixels, and then obtaining a second image of the scene at a second time, wherein each of the plurality of pixels in the first image has a corresponding pixel in the second image. A non-binary weight value for the first pixel's corresponding pixel in the second image may then be determined. The method can then combine the first pixel and it's corresponding pixel from the second image to obtain a first fused pixel when the non-binary weight value is greater than a specified threshold. The first pixel and it's corresponding pixel from the second image may not be combined when the non-binary weight value is less than or equal to the specified threshold. The process can then be repeated to select, determine and combine for each of the plurality of other pixels in the first image to obtain a fused image.

In still another embodiment, a captured reference image may be fused with a captured non-reference image in an alternative way to obtain a fused image. This approach involves obtaining a first image of a scene captured at a first time, where the first image has a plurality of pixels, and then obtaining a second image of the scene captured at a second time, wherein the second image has a plurality of pixels and each pixel in the second image has a corresponding pixel in the first image. A multi-level pyramid representation of the first image may then be generated, wherein a top level of the multi-level pyramid comprises a low resolution representation of the first image and a base level of the first multi-level pyramid comprises a high resolution representation of the first image, and wherein each level between the top level and the base level comprises a high spatial frequency representation of the first image corresponding to a resolution of the level. The method may then generate a multi-level pyramid representation of the second image, wherein a top level of the second multi-level pyramid comprises a low resolution representation of the second image and a base level of the second multi-level pyramid comprises a high resolution representation of the second image, and wherein each level between the top level and the base level has a corresponding level in the multi-level pyramid representation of the first image. The method may then generate a level in an output multi-level pyramid representation of the scene for each level in the first and second multi-level pyramid representations of the scene by identifying, for each group of pixels in a level of the first multi-level pyramid representation of the scene, a corresponding group of pixels in the second multi-level pyramid representation of the scene, and fusing the identified group of pixels from the first and second multi-level pyramid representations of the scene. Finally, by combining the output multi-level pyramid representation of the scene, an output image representative of the scene may be generated and stored in a memory.

In yet another embodiment, a captured reference image may be fused with a captured non-reference image in another way to obtain a fused image. This approach involves obtaining a first image of a scene captured at a first time, where the first image has a plurality of pixels, and then performing a multi-resolution decomposition of the first image to generate a first multi-level pyramid representation of the first image. A second image of the scene may then be obtained, wherein the second image is captured at a different time from the first image, and wherein each of the plurality of pixels in the first image has a corresponding pixel in the second image. A multi-resolution decomposition of the second image can then be performed to generate a second multi-level pyramid representation of the second image. The method then generates a level in an output multi-level pyramid representation of the scene for each level in the first and second multi-level pyramid representations of the scene by selecting one or more pixels from the first image, determining a non-binary weight value for one or more pixels in the second image corresponding to the one or more pixels in the first image, and combining the one or more pixels from the first image and their corresponding one or more pixels from the second image to obtain a first fused pixel when the non-binary weight value is greater than a specified threshold and not combining the one or more pixels from the first image and it's corresponding pixels from the second image when the non-binary weight value is less than or equal to the specified threshold. The process may then be repeated to generate a level in an output multi-level pyramid representation of the scene for each level in the multi-resolution decomposition of the first image. Different levels in the output multi-level pyramid representation of the scene may be combined to generate an output image.

DETAILED DESCRIPTION

This disclosure pertains to systems, methods, and computer readable media to improve image stabilization operations. In one embodiment, a novel approach for fusing registered non-reference images with a reference image in a set of commonly captured images may be utilized. The fusing approach may utilize a soft transition between pixels by using a weighted average for ghost/non-ghost pixels to avoid sudden transitions between neighborhoods of almost similar pixels. The ghost/non-ghost decision can be made, in an alternative embodiment, based on a set of neighboring pixels rather than independently for each pixel. An alternative approach may involve performing a multi-resolution decomposition of all the captured images, using a weighted average and/or examining a set of neighboring pixels at each level to determine which pixels to fuse at each level, and combining the different levels to generate an output image.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of image stabilization systems having the benefit of this disclosure.

Figure 1:
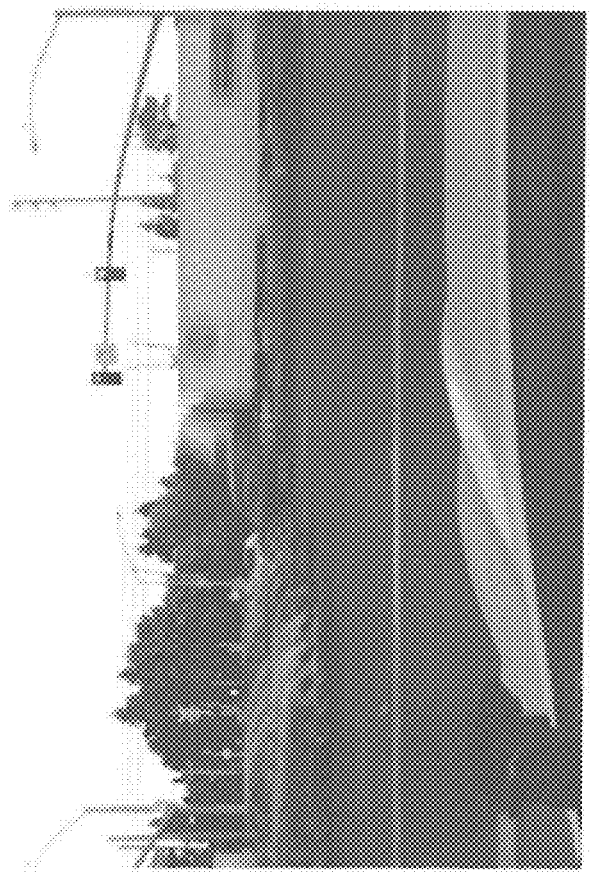
FIG. 1 shows an example of image fusion operations in accordance with prior art.
Figure 2:
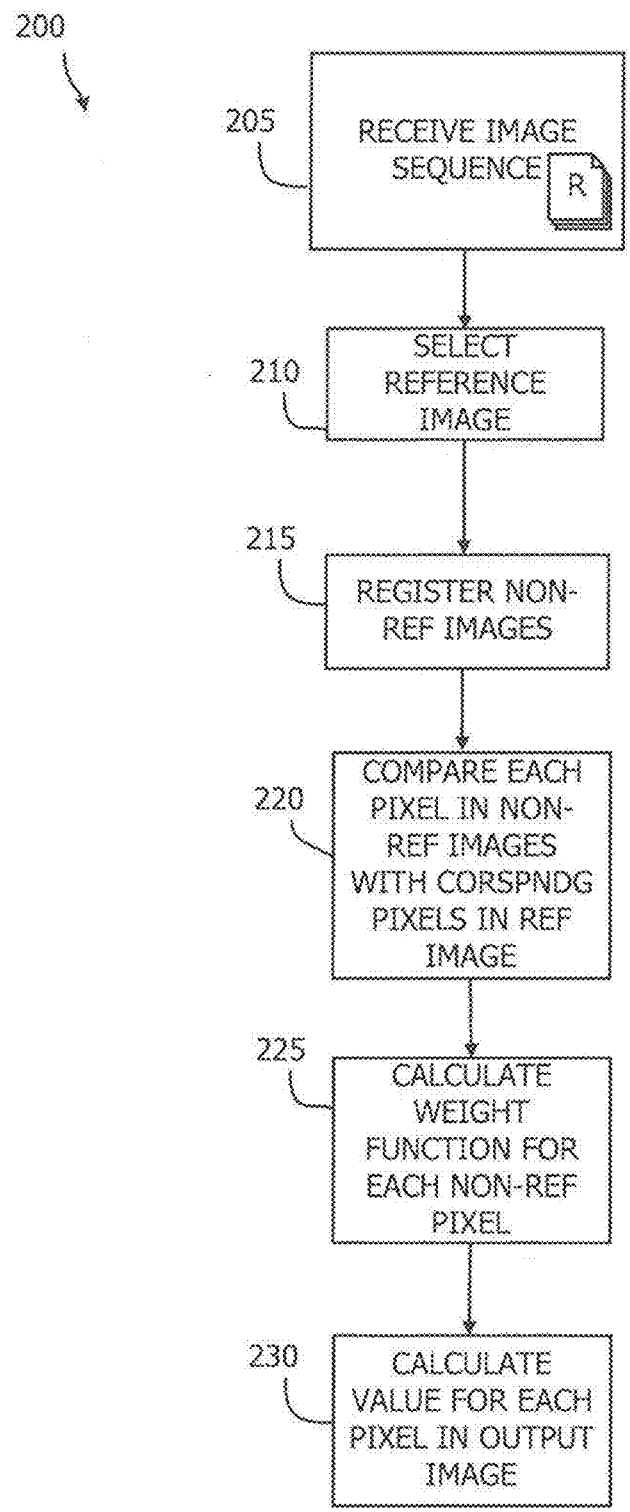
FIG. 2 shows, in flowchart form, a fusion operation in accordance with one embodiment.

One novel approach to image stabilization involves creating the output image by the temporal fusion of registered non-reference images with the reference image. Referring to FIG. 2, in one embodiment according to this approach, image stabilization operation 200 begins when an image sequence R is received (block 205). One of the first steps in a typical image stabilization operation is to select one of the images in the sequence as the reference image (block 210). There are a variety of methods known in the art for selecting the reference image. U.S. patent application Ser. No. 13/911,873, filed concurrently with this application and entitled "Reference Frame Selection for Still Image Stabilization", incorporated herein by reference in its entirety, describes one such method. After a reference image has been selected, the remaining images in the sequence may be globally registered with respect to the reference image (block 215). One approach for global registration of non-reference images with respect to the reference image is discussed in U.S. patent application entitled "Image Registration Methods for Still Image Stabilization" filed concurrently with this application and incorporated herein by reference, in its entirety.

Once non-reference images are globally registered, corresponding pixels in all of the images in the image sequence may have the same spatial coordinates (x,y). Because the images are acquired at different moments of time, each pixel can be represented by a third coordinate, representing time, that merely corresponds to the image index (x,y,t). For instance, the pixel (x,y,3) may represent the pixel located in the third image at the spatial coordinates (x,y).

Figure 3:
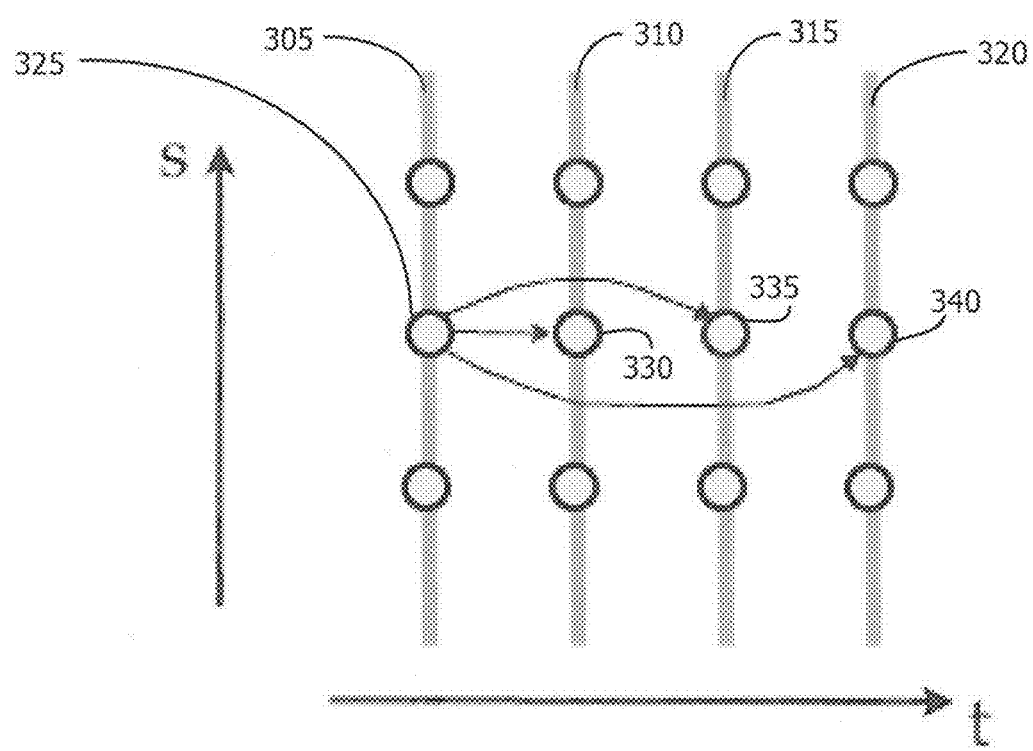
FIG. 3 shows an exemplified temporal fusion operation in accordance with one embodiment.

Temporal fusion involves fusing the pixels along their temporal dimension. This is illustrated in FIG. 3, in which line 305 represents the reference image and each of the lines 310, 315 and 320 represent one registered non-reference image in the image sequence. For simplicity, only one spatial coordinate, denoted s, is shown. The horizontal axis represents the temporal coordinate along which the received frames can be placed. Pixel 325 represents a pixel in the reference image that needs to be fused with corresponding pixels in the non-reference images. As can be seen, in temporal fusion, the current pixel may be fused with pixels that have the same spatial coordinates in all the images. Thus in FIG. 3, pixel 325 may be fused with pixels 330, 335 and 340.

Non-reference image pixels corresponding to a reference image pixel may sometimes be occluded due to moving objects in the scene. As discussed above, fusing such pixels with the reference pixel may result in ghosting artifacts. In order to prevent ghosting artifacts in the final output image, temporal fusion operation 200 (referring back to FIG. 2) can decide whether a pixel in a non-reference image is a ghost or not. This may be done by comparing each pixel in a non-reference image with the corresponding pixel in the reference image (block 220) to determine the similarity between the two pixels.

Rather than taking a hard ghost/non-ghost decision based on pixel similarity, however, the operation may calculate a weight function for each non-reference pixel (block 225). The weight function, in one embodiment, may have a value between 0 and 1. A weight 1 may correspond to a non-ghost pixel and a weight 0 to a ghost pixel.

In one implementation, the weight may be calculated by comparing each non-reference pixel to its corresponding pixel in the reference image. In an alternative embodiment, the weight can be calculated based on the pixel similarity value and the expected noise content at the specific exposure parameters. As is known in the art, many cameras have a known expected noise content for each pixel at specific exposure parameters. A pixel's expected noise content can be used in calculating its weight function. This may done by calculating a weight W(x,y) for a pixel (x,y) based on a noise standard deviation S(x,y) and pixel similarity value D(x,y). The pixel similarity value may be a pixel difference value between the pixel (x, y) and its corresponding reference pixel. Assuming that the images are represented in the YUV color space, for every pixel we may have three pixel value differences (Dy, Du, Dv), and three noise standard deviations (Sy, Su, Sv).

The specific weight function used can vary and is a matter of design choice. In one embodiment, the weight function can be a Gaussian function. In another embodiment, the weight function may be linear. Equation (1) represents an example weight function.

$$\omega_t = \omega_Y * \omega_U * \omega_V \tag{1}$$

Where $\omega_t$ represents the weight assigned to the non-reference pixel (x,y,t), $\omega_Y$ stands for the weight component corresponding to the Y channel, $\omega_U$ corresponds to the weight component for the U channel, and $\omega_V$ stands for the weight component for the V channel. In this embodiment, the calculated weight function $\omega_t$ represents a probability that the pixel (x,y,t) is a non-ghost pixel. In an embodiment, where the weight is calculated based on the expected noise content and pixel value difference, the weight parameters may be calculated in accordance with the following equations:

$$\omega_y = \exp\left(K_y * \left(\frac{D_y}{S_y}\right)\wedge 2\right) \tag{2}$$

$$\omega_u = \exp\left(K_u * \left(\frac{D_u}{S_u}\right)\wedge 2\right) \tag{3}$$

$$\omega_v = \exp\left(K_v * \left(\frac{D_v}{S_v}\right)\wedge 2\right) \tag{4}$$

Where $(K_y, K_u, K_u)$ may be constants whose value can be set according to design preferences.

Figure 4:
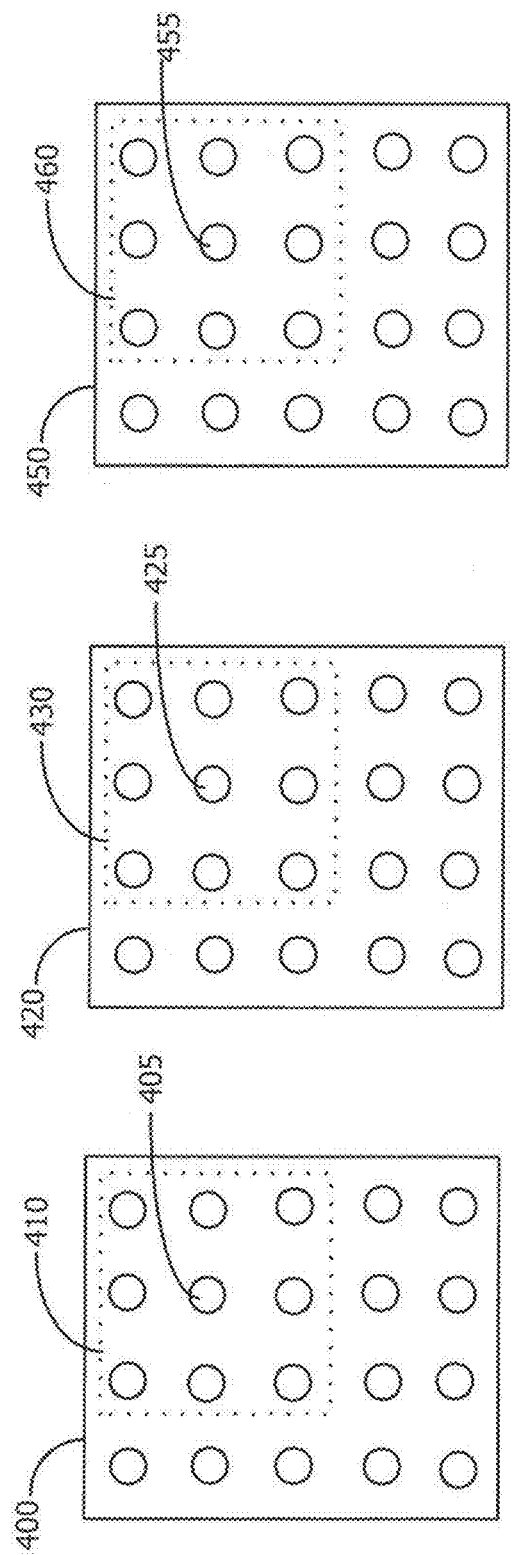
FIG. 4 shows an exemplified temporal fusion operation using block pixels in accordance with one embodiment.

An alternative approach for determining whether or not a pixel is a ghost is to compare blocks of pixels with each other. This can be done, for every pixel (x,y), by analyzing a block of pixels centered around (x,y), rather than analyzing the individual pixel alone. An example is illustrated in FIG. 4, where image 400 represents the reference image and images 420 and 450 represent two non-reference images. When weights need to be calculated for fusing pixel 405 of image 400 with the corresponding pixels 425 and 455, block 410 which is centered around pixel 405 may be compared with blocks 430 and 460, each of which is centered around the corresponding pixel in the respective non-reference image. Instead of calculating the difference between the individual pixels then, a difference may be calculated between the corresponding blocks, e.g. block 410 and block 430 or block 410 and block 460. This can be done, for example, by calculating the Mean Absolute Difference (MAD) or the Mean Square Difference (MSD) between the blocks. The MAD can be calculated in accordance with the following equation:

$$\Sigma_{i,j=-1}^{1} \|y(x_r+i, y_r+j) - (x_p+i, y_p+j)\| \tag{5}$$

Where $(x_r, y_r)$ represents the coordinates of the pixel located in the non-reference image whose status as ghost/non-ghost is being determined and $(x_p, y_p)$ represents the coordinates of a corresponding pixel located in the reference image. I and j are summation indices which are spanning the block around each pixel, and '||' represents an absolute value operator. Once the pixel difference value is calculated for the block according to equation (5), the calculated value is used in calculating the weight parameters $\omega_Y$, $\omega_U$, $\omega_V$ as discussed above. The size of the block selected can vary and is a matter of design choice. In one embodiment, the block may be 3×3. In another implementation, the block can be 5×5.

Referring again to FIG. 2, once the weight is calculated for each non-reference pixel, the resulting value may be used to calculate a value for the corresponding pixel in the output image (block 230). The following equation may be used for this calculation:

$$r(x, y) = \frac{p(x, y, 0) + \sum_{t} w_t p(x, y, t)}{1 + \sum_{t} w_t} \qquad (6)$$

Where r(x,y) stands for the final output pixel value, p(x,y,t) represents the pixel value at the spatial coordinate (x,y) in image t, and $\omega_t$ is the weight assigned to the non-reference pixel (x,y,t). The reference image may be assumed to have the temporal coordinate of t=0.

By using a weight function instead of a set threshold, the temporal fusion operation can provide a soft transition between ghost and non-ghost pixels, thus avoiding sudden transitions and the resultant image artifacts. Considering only the pixels that have the same (x,y) spatial coordinates in all the images, however, restricts the process to achieving only as good a noise removal as the number of short exposed images received for each sequence. For instance, if only 4 images are received in an image sequence, a reference pixel can be averaged with a maximum of three un-occluded pixels in the other images. If a pixel in one or more of the images is a ghost, the number of pixels that can be fused is reduced even further. Having more pixels to choose from, in such instances, has been found to significantly improve the quality of the final output image. This can be done, in one embodiment by using an operation referred to herein as spatio-temporal fusion.

Figure 5:
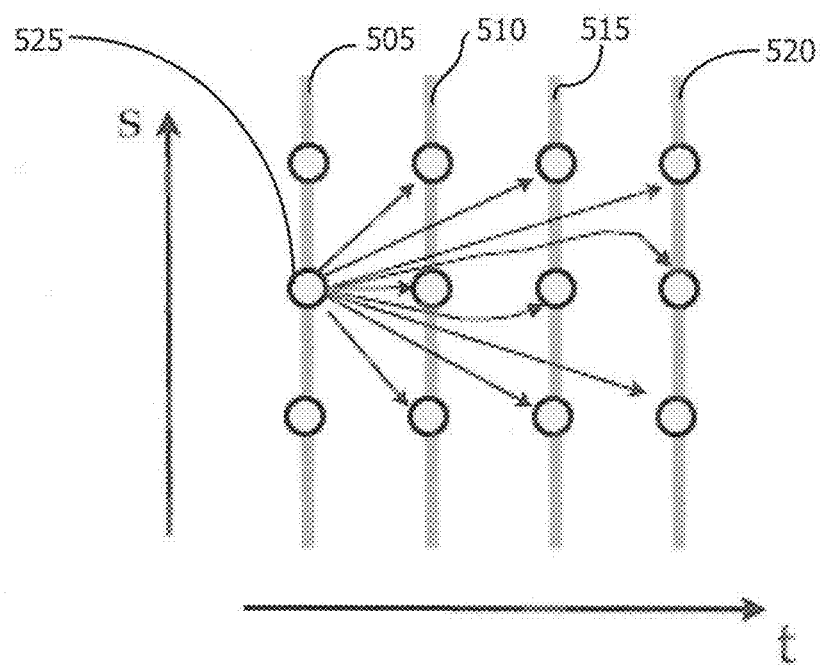
FIG. 5 shows an exemplified spatio-temporal fusion operation in accordance with one embodiment.

Spatio-temporal fusion in one embodiment may involve expanding the temporal fusion approach by fusing not only pixels that have the same spatial coordinates but also other possible pixels. Thus, a pixel (x,y) in the reference image can be matched with pixels that have different spatial coordinates in the non-reference images. This is illustrated in FIG. 5 in which the pixel 525 from the reference image 505 is fused with multiple pixels in each of the non-reference images 510, 515, and 520.

Figure 6:
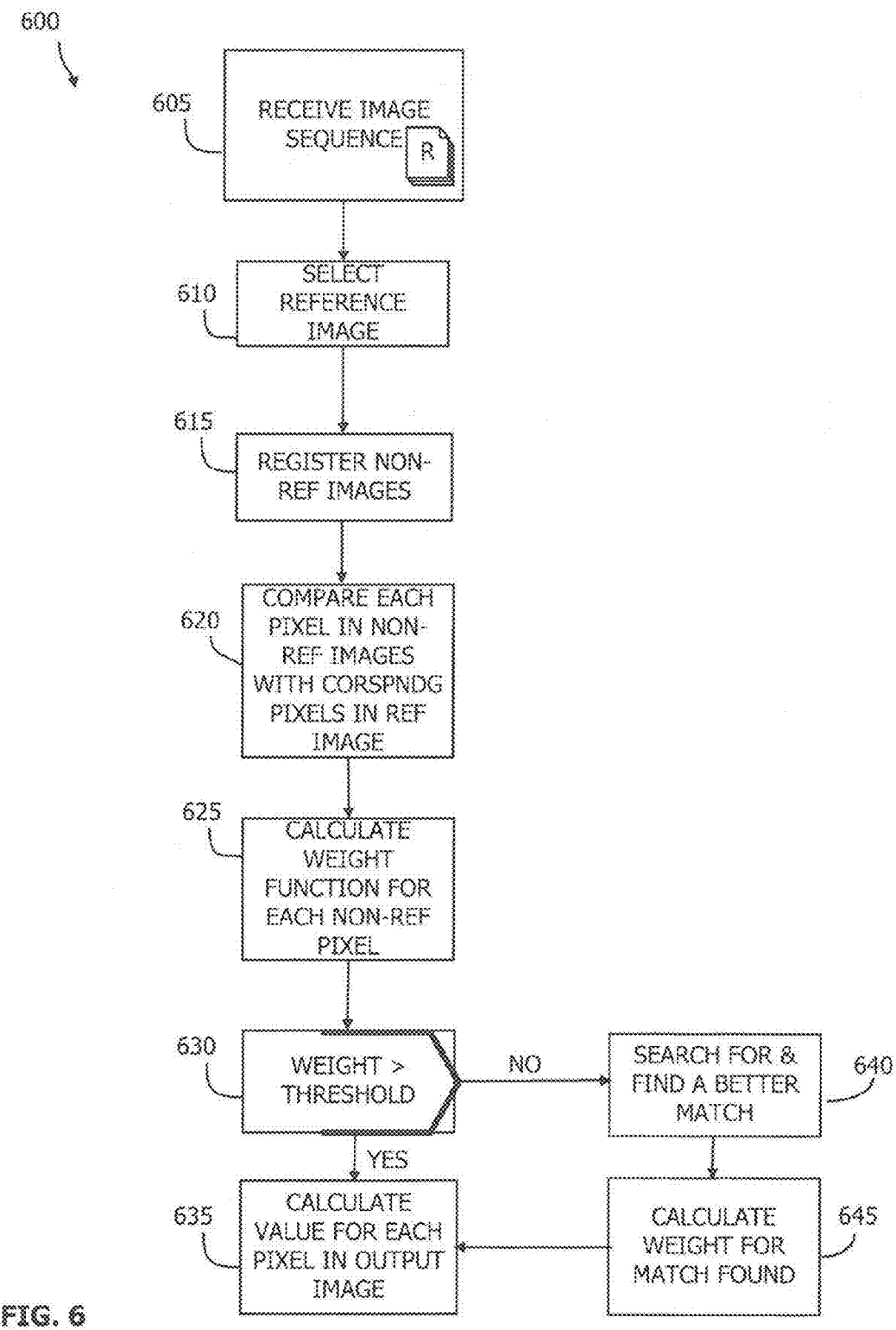
FIG. 6 shows, in flowchart form, a multi-resolution fusion operation in accordance with one embodiment.

Referring to FIG. 6, in one embodiment according to this approach, image stabilization operation 600 begins when an image sequence R is received (block 605). A reference image may then be selected from the image sequence (block 610) and the non-reference images registered with respect to the selected reference image (block 615). Each pixel (x, y) in the non-reference images may then be compared to the corresponding pixel in the reference image (block 620) to calculate the weight function for each non-reference pixel (block 625). Once the weight is calculated, it can be compared to a pre-determined threshold to determine if it is likely that the pixel is a ghost (block 630).

The pre-determined threshold can be selected from any of the possible values for the weight. In one embodiment, the threshold may equal 10% of the maximum value for the weight. Thus if the value of the weight ranges between zero and one, the threshold may be 0.1.

In one embodiment, the decision on whether or not a pixel represents a ghost can be made in a similar manner as in temporal fusion by comparing a small image block centered around a corresponding pixel in the reference image with a similar block centered around the pixel that is being analyzed.

If the weight is determined to be larger than the threshold at block 630, temporal fusion may be used to calculate a value for a corresponding pixel in the output image (block 635). If the weight is less than the threshold, indicating that the pixel is likely a ghost pixel, then the operation 600 may perform a spatial search in the image containing the pixel (x,y) to find a better candidate for fusion (block 640). The spatial search can be performed, in one embodiment, by considering all other spatial locations in a neighborhood of pixel (x,y). This may be done by considering all the pixels in the non-reference images that have a spatial location in a certain neighborhood around (x,y). An alternative embodiment involves using only a subset of the non-reference pixels that are located in a certain neighborhood of the spatial coordinate (x,y). As discussed previously for temporal fusion, an alternative approach may involve matching a pixel block centered around the reference pixel with a corresponding pixel block surrounding each one of the selected pixel candidates from the non-reference images. The subset of non-reference pixel candidates can also be changed from one reference pixel to another. This means when processing a new reference pixel, the pattern of non-reference pixel candidates can be different from the pattern used when processing a previous reference pixel.

Regardless of the approach used for searching, once one or more pixels are found in each non-reference image for fusion with the corresponding pixel in the reference image, the weight for the selected pixels may be calculated in a similar manner as before (block 645). The calculated weight value may then be used to determine a value for a corresponding pixel in the output image (block 635).

It has been found that combining temporal and spatial fusion in this manner can increase efficiency, while also improving the quality of the output image. That is because searching for a better pixel is only done when a pixel is determined to likely be a ghost. This means that the searching operation is generally performed for only a limited number of pixels as opposed to all pixels in the images, thus significantly improving efficiency.

The temporal and spatio-temporal fusion operations discussed above work well when all the images in the image sequence are relatively sharp. There is, however, no guarantee that all images in the image sequence will be sharp. While it is true that the reference image is generally a sharp image, some of the non-reference images may be blurry due to camera or fast object motion. By fusing the images as explained in the previous operations, the blur present in any non-reference image may become visible in the output image. This is exemplified in FIGS. 7 and 8.

Figure 7:
FIG. 7 shows an exemplary captured image sequence in accordance with an alternative embodiment.
Figure 8B:
FIGS. 8A-8B show fused output images created by fusing the captured image sequence of FIG. 7, in accordance with yet alternative embodiment.
Figure 8A:

FIG. 7 illustrates four short exposed images 705, 710, 715, and 720 in an image sequence that is being processed by an image stabilization operation in accordance with this disclosure to create an output image. As can be seen, the image 705 in the image sequence exhibits significant motion blur artifacts. FIG. 8A shows the resulting output image 805 of fusing of images 705, 710, 715, and 720 using temporal or spatio-temporal fusion. As can be seen, the blur present in the input image 705 is also present in the final output image 805. To avoid this problem, a multi-resolution fusion strategy that fuses the images differently in different frequency bands resulting in an efficient elimination of blurring regions present in some input images can be used.

Degradation caused by blurry frames is mainly manifested in the neighborhood of image edges and high frequency textures. In contrast, in smooth image areas (e.g., low spatial frequency bands), the contribution of blurry frames can be useful in reducing noise. The multi-resolution fusion approach, in one embodiment, takes advantage of this understanding by using blurry frames in fusing low spatial frequency content and excluding them in fusing image edges or high frequency textures.

One way to implement this approach may be to decompose each of the images in an input image sequence into different spatial frequency bands and fuse each such frequency band separately. Multi-resolution image decomposition in different frequency bands is known in the art and can be achieved in various ways. One procedure may be to use a high-pass pyramid decomposition algorithm. Another approach can be to utilize wavelet decomposition. Other alternatives are also possible.

In a preferred embodiment, a high-pass decomposition algorithm may be used. This algorithm may involve creating a sequence of copies of an original image in which the sample density and the resolution are decreased in regular steps to create multiple intermediary levels of the original image. To achieve this, the image may first be low-pass filtered and then down-sampled by a predetermined factor to obtain the next pyramid level for the image. The predetermined factor can vary and is a matter of design choice. In one embodiment, the predetermined factor is four. In an alternative embodiment, the predetermined factor is two. The number of levels of each image created also varies depending on the needs and processing capabilities of the device used. In one embodiment, the number of levels is four. In an alternative embodiment, the number of levels is three.

Figure 9:
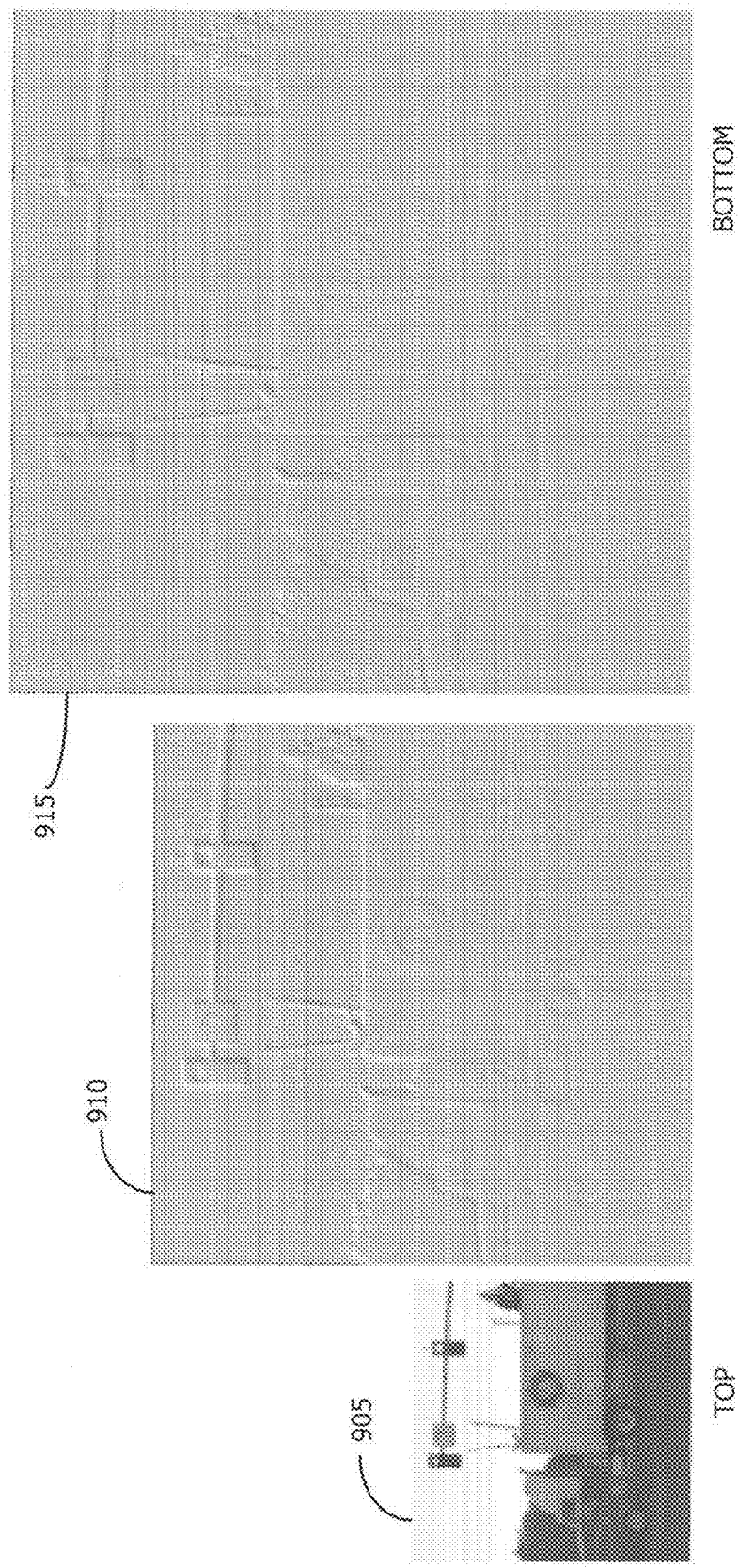
FIG. 9 shows exemplary images created by multi-resolution decomposition in accordance with one embodiment.

Once all of the intermediary levels have been created in this manner, each level may be up-sampled and low-pass filtered to the same resolution as the previous level and the result subtracted from the previous level to obtain the high frequency band component corresponding to that resolution at each level. It should be noted, however, that the high frequency band from the top level can generally not be obtained in this manner. In the resulting pyramid, each level is smaller than the previous level and contains the high spatial frequency band at that resolution. The top level of the pyramid resembles a low resolution version of the original image and contains the low spatial frequency band. An example of this is illustrated in FIG. 9 which includes three levels 905, 910, and 915. The top level image 905 is low frequency representation of the image. The levels exhibit progressively higher resolutions/frequencies from the top to the bottom. In this manner, the original image may be decomposed into different spatial frequency bands, such that those bands can be fused together separately.

Figure 10:
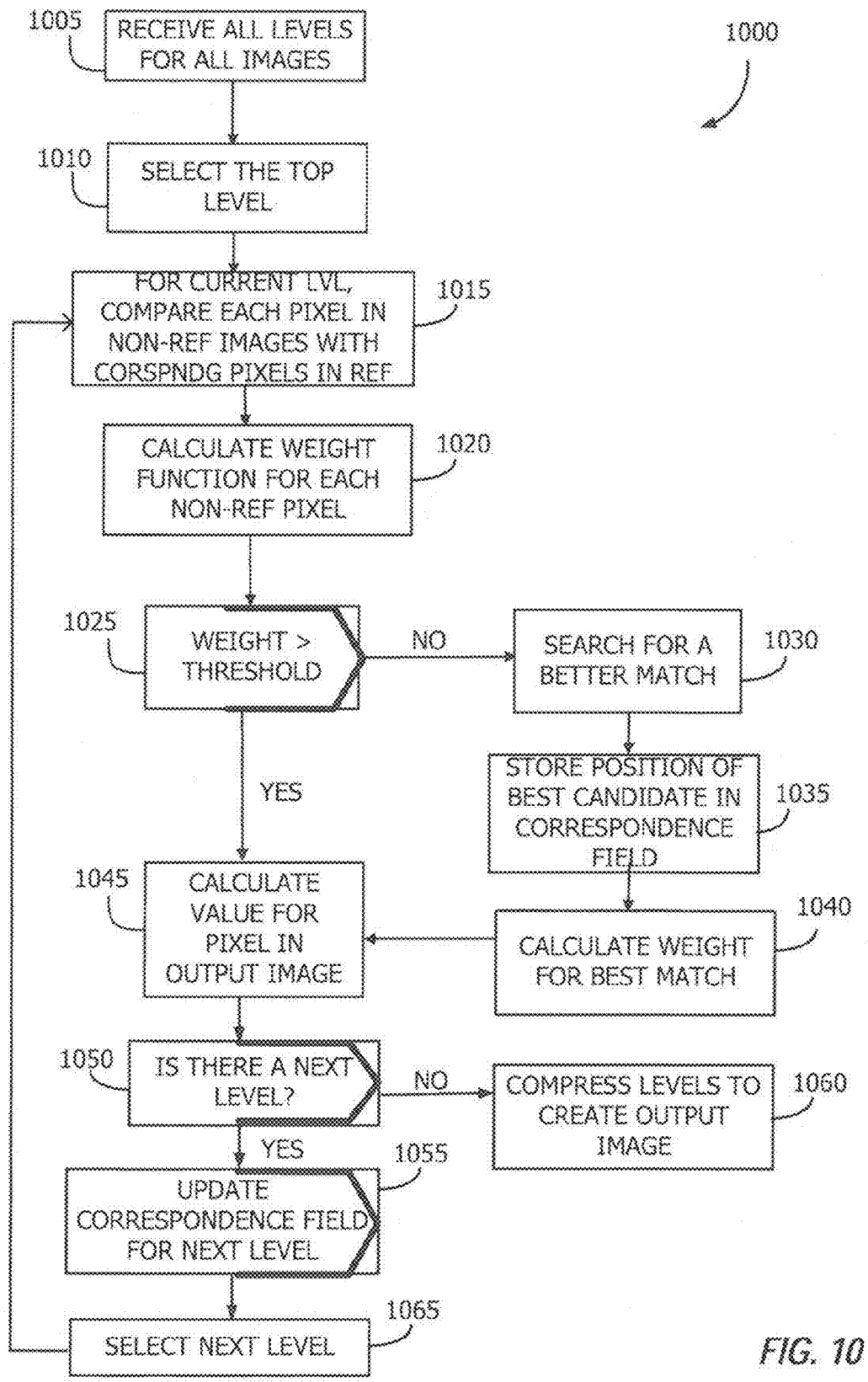
FIG. 10 shows, in flow-chart form, a multi-resolution fusion operation in accordance with one embodiment.

Once the various levels have been created for each of the images in the image sequence (including the reference image), a multi-resolution fusion operation moo, in accordance with FIG. 10, may begin by receiving all of the levels for each of the images in the image sequence (block 1005). The top level image may then be selected for processing (block 1010) and temporal fusion may be performed at the top level. This may be done by comparing each pixel at the top level of the non-reference images with the corresponding pixels in the reference image (block 1015) and calculating a weight function for each non-reference pixel, as discussed above (block 1020). After a weight function is calculated for each pixel, the weight may be compared to a predetermined threshold to decide whether the pixel is a ghost (block 1025). If the calculated weight is above the predetermined threshold, the non-reference pixel may be used in calculating a value for a corresponding pixel at the top level of the output image (block 1045).

If the weight is lower than the predetermined threshold, then the operation 1000 may make use of spatio-temporal techniques by performing a spatial search in a neighborhood of the selected pixel to find a better match (block 1030). The relative position or coordinates of the best match may then be stored in a correspondence field for the selected pixel (block 1035). The correspondence field refers to a field of identified corresponding pixels. The operation can then calculate the weight function for the best matched pixel (block 1040) and, using this value determine a value for the corresponding pixel at the top level of the output image (block 1045).

Once processing is complete for all the pixels at the top level, the operation may move to block 1050 to determine if there is another level to be processed. If all levels have been processed, values may be available for pixels at all the levels of the output image. The levels may then be synthesized or combined to create the final output image (block 1060). This can be done by starting at the top pyramid level and scaling up (i.e., up-sampling and low-pass filtering) the output level and then adding it to the next output level. This operation may be repeated until all the levels have been combined and the output image has the same resolution as the input image. If it is determined at block 1050 that another level remains, the correspondence field for each found best match at the current level may be updated (block 1055). This may be done by taking into account the predetermined factor by which each level was down-sampled and scaling up the position information in the correspondence field by the same factor to match the resolution for the next level. The next level may then be selected for processing (block 1065) and the process repeated beginning at block 1015. However, for this level, the updated correspondence field may be used as an initial estimate for where to look for to find a corresponding pixel for each reference pixel. Steps 1005-1055 may be repeated until all levels are processed and a final output image is created in accordance with block 1060.

In this manner, the operation 1000 performs fusion at every pyramid level starting with the top level (low-frequency band) and ending with the highest resolution level. At every level, the similarity between the corresponding non-reference and reference pixels may be used in order to avoid ghosting artifacts. At the top level of the pyramid, an assumption may be made that the corresponding pixels have the same spatial coordinates. However, because due to moving objects in the scene the corresponding pixels do not have the same spatial coordinates in the next levels, for every non-reference level a correspondence field that stores the spatial displacement between each non-reference pixel and its corresponding reference pixel may be determined. If the weight is below a certain threshold then the non-reference pixel is determined to be likely a ghost. In such a case, a local search around its spatial position may be performed in order to find a better match with the reference pixel. The best match found may then be used in fusion with its associated weight, and the spatial displacement of the best match found with respect to the reference pixel coordinates may be retained. Typically, such a search is needed only for a small percent of pixels since most of the scene is static. This increases efficiency, as the process only performs a search when needed. The search can be done by block matching as discussed above. By taking these steps, the approach 1000 utilizes all three discussed fusion techniques (temporal, spatio-temporal, and multi-resolution) to perform an efficient fusion operation that can significantly reduce or eliminate noise and blur and produces a high quality final output image.

Alternatively, the multi-resolution fusion approach can be performed by only using temporal fusion at each level. This can be done by fusing at each pyramid level, using only those pixels that have the same spatial coordinates in all the images. Thus, a single pixel from each non-reference level may be fused with the corresponding reference pixel (in a corresponding reference image level) that has the same spatial coordinate.

In an alternative embodiment, to obtain the advantages of spatio-temporal fusion, the multi-resolution fusion procedure may utilize spatio-temporal fusion at each pyramid level. This can be done, in one embodiment, by fusing a reference pixel, at every pyramid level, with more pixels from each non-reference level. The spatial coordinates of the non-reference pixels that are fused with the reference pixels may be in a certain neighborhood around the reference pixel coordinates.

Another embodiment may make use of a motion field to perform fusion. This may be achieved by estimating a motion field for each non-reference image starting from the top level of the pyramid. At every level of the pyramid, the motion field may associate the most similar reference and non-reference pixels to be fused. Every reference pixel may then be fused with a single pixel from every non-reference level, but their spatial coordinates may be different in accordance to the motion field at the level.

Yet another embodiment may be utilized in which a reference pixel is fused with more than one pixel from any non-reference level. The spatial coordinates of the non-reference pixels may be in a certain neighborhood around the spatial coordinates suggested by the motion field.

As used herein, the term "camera" refers to any electronic device that includes or incorporates digital image capture functionality. This includes, by way of example, stand-alone cameras (e.g., digital SLR cameras and 'point-and-click' cameras) as well as other electronic devices having embedded camera capabilities. Examples of this latter type include, but are not limited to, mobile phones, tablet and notebook computer systems, and digital media player devices.

Figure 11:
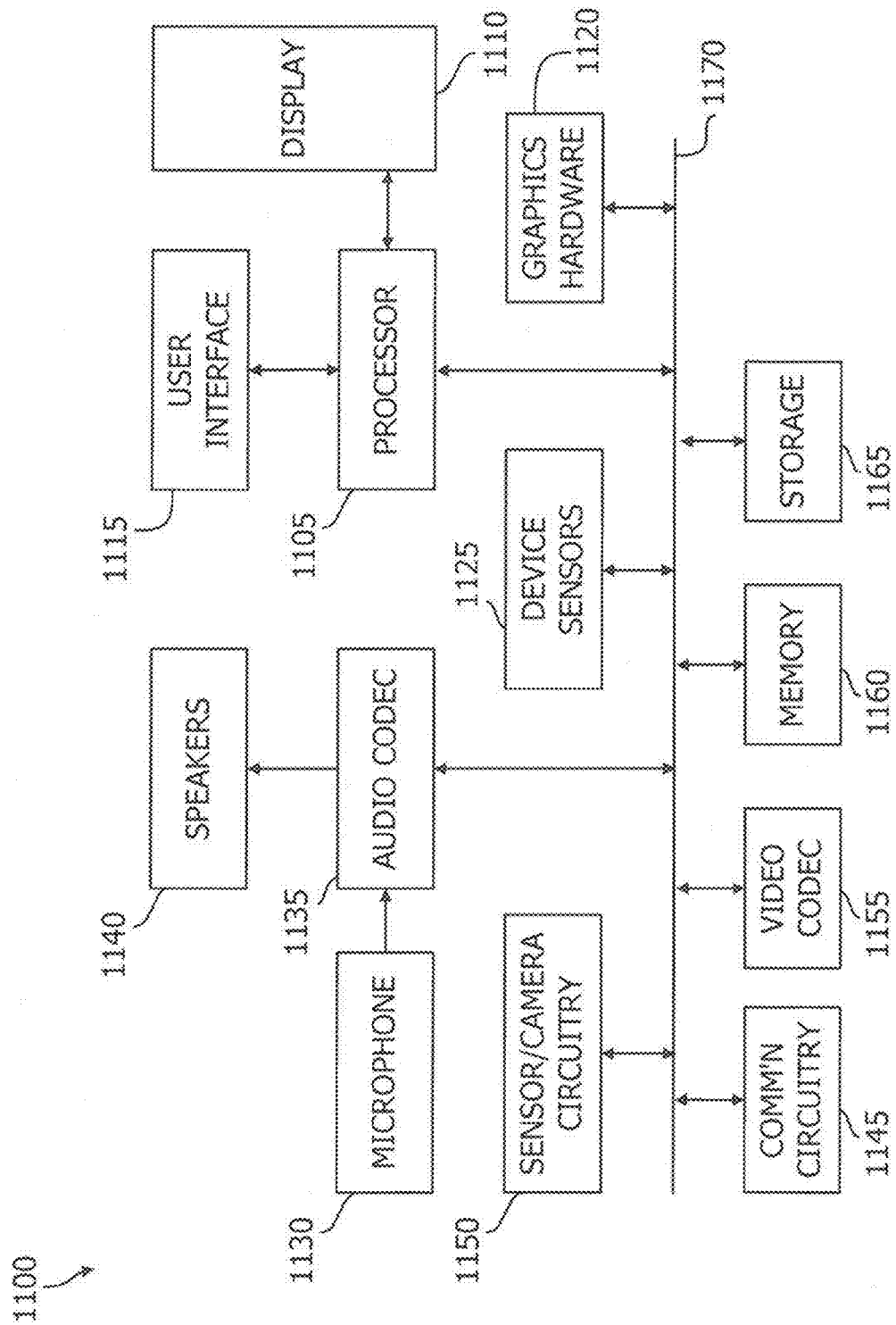
FIG. 11 shows, in block diagram form, a multi-function electronic device in accordance with one embodiment.

Referring to FIG. 11, a simplified functional block diagram of illustrative electronic device 1100 is shown according to one embodiment. Electronic device 1100 may include processor 1105, display 1110, user interface 1115, graphics hardware 1120, device sensors 1125 (e.g., proximity sensor/ambient light sensor, accelerometer and/or gyroscope), microphone 1130, audio codec(s) 1135, speaker(s) 1140, communications circuitry 1145, digital image capture unit 1150, video codec(s) 1155, memory 1160, storage 1165, and communications bus 1170. Electronic device 1100 may be, for example, a digital camera, a personal digital assistant (PDA), personal music player, mobile telephone, server, notebook, laptop, desktop, or tablet computer. More particularly, the disclosed techniques may be executed on a device that includes some or all of the components of device 1100.

Processor 1105 may execute instructions necessary to carry out or control the operation of many functions performed by device 1100. Processor 1105 may, for instance, drive display 1110 and receive user input from user interface 1115. User interface 1115 can take a variety of forms, such as a button, keypad, dial, a click wheel, keyboard, display screen, a touch screen, or combinations thereof. Processor 1105 may also, for example, be a system-on-chip such as those found in mobile devices and include a dedicated graphics processing unit (GPU). Processor 1105 may be based on reduced instruction-set computer (RISC) or complex instruction-set computer (CISC) architectures or any other suitable architecture and may include one or more processing cores. Graphics hardware 1120 may be special purpose computational hardware for processing graphics and/or assisting processor 1105 to process graphics information. In one embodiment, graphics hardware 1120 may include a programmable graphics processing unit (GPU).

Sensor and camera circuitry 1150 may capture still and video images that may be processed, at least in part, in accordance with the disclosed techniques by video codec(s) 1155 and/or processor 1105 and/or graphics hardware 1120, and/or a dedicated image processing unit incorporated within circuitry 1150. Images so captured may be stored in memory 1160 and/or storage 1165. Memory 1160 may include one or more different types of media used by processor 1105 and graphics hardware 1120 to perform device functions. For example, memory 1160 may include memory cache, read-only memory (ROM), and/or random access memory (RAM). Storage 1165 may store media (e.g., audio, image and video files), computer program instructions or software, preference information, device profile information, and any other suitable data. Storage 1165 may include one or more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 1160 and storage 1165 may be used to tangibly retain computer program instructions or code organized into one or more modules and written in any desired computer programming language. When executed by, for example, processor 1105 such computer program code may implement one or more of the operations described herein.

It is to be understood that the above description is intended to be illustrative, and not restrictive. The material has been presented to enable any person skilled in the art to make and use the claimed subject matter as described herein, and is provided in the context of particular embodiments, variations of which will be readily apparent to those skilled in the art (e.g., some of the disclosed embodiments may be used in combination with each other). For example, while FIGS. 1-11 have been described in the context of processing raw or unprocessed images, this is not necessary. Image stabilization operations in accordance with this disclosure may be applied to processed versions of the captured images (e.g. edge-maps) or sub-sampled versions of the captured images. In addition, some of the described operations may have their individual steps performed in an order different from, or in conjunction with other steps, that presented herein. More generally, if there is hardware support some operations described in conjunction with FIGS. 1-11 may be performed in parallel.

Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device, readable by a programmable control device and comprising instructions stored thereon to cause the programmable control device to:
obtain a first image of a scene captured at a first time, the first image having a plurality of pixels;
perform a multi-resolution decomposition of the first image to generate a first multi-level pyramid representation of the first image;
obtain a second image of the scene, wherein the second image is captured at a different time from the first image, and wherein each of the plurality of pixels in the first image has a corresponding pixel in the second image;
perform a multi-resolution decomposition of the second image to generate a second multi-level pyramid representation of the second image;
generate a level in an output multi-level pyramid representation of the scene for each level in the first and second multi-level pyramid representations of the scene in accordance with instructions to cause the programmable control device to:

identify, for a group of pixels in a level of the first multi-level pyramid representation of the scene, a corresponding group of pixels in the level from the second multi-level pyramid representation of the scene;

determining a weight value associated with each group of pixels in the level from the first multi-level pyramid representation of the scene and the identified corresponding group of pixels in the level from the second multi-level pyramid representation of the scene;

perform a spatial search of the level of the second multi-level pyramid representation of the scene to find a better corresponding group of pixels when the weight value is less than or equal to a specified threshold;

determine a weight value for the better corresponding group of pixels; and fuse the identified group of pixels from the first multi-level pyramid representations of the scene with the better corresponding group of pixels from the second multi-level pyramid representation when the determined weight value for the better corresponding group of pixels is greater than the specified threshold;

repeat the instructions to cause the programmable control device to generate a level in the output multi-level pyramid representation of the scene for each level in the multi-resolution decomposition of the first image;

combine the output multi-level pyramid representations of the scene to generate a single output image representative of the scene; and store the output image in a memory.

2. The non-transitory program storage device of claim 1, further comprising instructions to cause the programmable control device to:

not fuse the identified group of pixels from the first multi-level pyramid representations of the scene with the better corresponding group of pixels from the second multi-level pyramid representation when the determined weight value for the better corresponding group of pixels is less than or equal to the specified threshold.

3. The non-transitory program storage device of claim 1, wherein the instructions to cause the programmable control device to determine a weight value associated with each group of pixels in the level from the first multi-level pyramid representation of the scene and the identified corresponding group of pixels in the level from the second multi-level pyramid representation of the scene comprise instructions to cause the programmable control device to:

compare a similarity between each pixel in the group of pixels in the level of the first multi-level pyramid representation of the scene and a corresponding pixel in the identified corresponding group of pixels in the level from the second multi-level pyramid representation of the scene;

obtain a pixel similarity value based on the comparison;

obtain an expected noise content for each pixel in the group of pixels in the level of the first multi-level pyramid representation of the scene; and calculate the weight value based on the pixel similarity value and the expected noise content.

4. The non-transitory program storage device of claim 1, wherein the better corresponding group of pixels comprises a group of pixels with a weight value greater than the specified threshold.

5. The non-transitory program storage device of claim 1, wherein the instructions to cause the programmable control device to fuse the identified group of pixels from the first multi-level pyramid representations of the scene with the better corresponding group of pixels from the second multi-level pyramid representation comprise instructions to cause the programmable control device to:

estimate a motion field for each second multi-level pyramid representation of the second image, wherein the motion field associates pixels from the first image with pixels from the second image; and fuse each pixel from the first multi-level pyramid representation with a pixel selected from the motion field.

6. The non-transitory program storage device of claim 1, wherein the instructions to cause the programmable control device to fuse the identified group of pixels from the first multi-level pyramid representations of the scene with the better corresponding group of pixels from the second multi-level pyramid representation comprise instructions to cause the programmable control device to fuse one pixel from the first multi-level pyramid representation with two or more pixels from the better corresponding group of pixels from the second multi-level pyramid representation, wherein spatial coordinates of the two or more pixels are in a pre-determined neighborhood of an identified corresponding pixel to the one pixel in the second multi-level pyramid representation.

7. The non-transitory program storage device of claim 1, wherein the instructions to generate a first multi-level pyramid representation of the first image comprise instructions to cause the programmable control device to generate a high-pass pyramid decomposition of the first image.

8. The non-transitory program storage device of claim 1, wherein the instructions to generate a first multi-level pyramid representation of the first image comprise instructions to cause the programmable control device to generate a wavelet decomposition of the first image.

9. A system comprising:

an image capture device;

memory; and one or more programmable control devices operable to interact with the image capture device and the memory, and to perform operations comprising:

obtaining a first image of a scene captured at a first time, the first image having a plurality of pixels;

performing a multi-resolution decomposition of the first image to generate a first multi-level pyramid representation of the first image;

obtaining a second image of the scene, wherein the second image is captured at a different time from the first image, and wherein each of the plurality of pixels in the first image has a corresponding pixel in the second image;

performing a multi-resolution decomposition of the second image to generate a second multi-level pyramid representation of the second image;

generating a level in an output multi-level pyramid representation of the scene for each level in the first and second multi-level pyramid representations of the scene in accordance with instructions to cause the programmable control device to perform operations comprising:

identifying, for a group of pixels in a level of the first multi-level pyramid representation of the scene, a corresponding group of pixels in the level from the second multi-level pyramid representation of the scene;

determining a weight value associated with each group of pixels in the level from the first multi-level pyramid representation of the scene and the identified corresponding group of pixels in the level from the second multi-level pyramid representation of the scene;

performing a spatial search of the level of the second multi-level pyramid representation of the scene to find a better corresponding group of pixels when the weight value is less than or equal to a specified threshold;

determining a weight value for the better corresponding group pixels; and fusing the identified group of pixels from the first multi-level pyramid representations of the scene with the better corresponding group of pixels from the second multi-level pyramid representation of the scene when the determined weight value for the better corresponding group of pixels is greater than the specified threshold;

combining the output multi-level pyramid representations of the scene to generate a single output image representative of the scene; and storing the output image in a memory.

10. The system of claim 9, wherein the one or more programmable control devices perform operations further comprising:

not fusing the identified group of pixels from the first multi-level pyramid representations of the scene with the better corresponding group of pixels from the second multi-level pyramid representation of the scene when the determined weight value for the better corresponding group of pixels is less than or equal to the specified threshold.

11. The system of claim 9, wherein determining a weight value associated with each group of pixels in the level from the first multi-level pyramid representation of the scene and the identified corresponding group of pixels in the level from the second multi-level pyramid representation of the scene comprises:

comparing a similarity between each pixel in the group of pixels in the level of the first multi-level pyramid representation of the scene and a corresponding pixel in the identified corresponding group of pixels in the level from the second multi-level pyramid representation of the scene;

obtaining a pixel similarity value based on the comparison;

obtaining an expected noise content for the group of pixels in the level of the first multi-level pyramid representation of the scene; and calculating the weight value based on the pixel similarity value and the expected noise content.

12. The system of claim 9, wherein the better corresponding group of pixels comprises a group of pixels with a weight value greater than the specified threshold.

13. The system of claim 9, wherein fusing the identified group of pixels from the first multi-level pyramid representations of the scene with the better corresponding group of pixels from the second multi-level pyramid representation comprises:

estimating a motion field for each second multi-level pyramid representation of the second image, wherein the motion field associates pixels from the first image with pixels from the second image; and fusing each pixel from the first multi-level pyramid representation with a pixel selected from the motion field.

14. The system of claim 9, wherein fusing the identified group of pixels from the first multi-level pyramid representations of the scene with the better corresponding group of pixels from the second multi-level pyramid representation of the scene comprises fusing one pixel from the first multi-level pyramid representation with two or more pixels from the better corresponding group of pixels from the second multi-level pyramid representation, wherein spatial coordinates of the two or more pixels are in a pre-determined neighborhood of an identified corresponding pixel to the one pixel in the second multi-level pyramid representation.

15. A method comprising:

obtaining a first image of a scene captured at a first time, the first image having a plurality of pixels;

performing a multi-resolution decomposition of the first image to generate a first multi-level pyramid representation of the first image;

obtaining a second image of the scene, wherein the second image is captured at a different time from the first image, and wherein each of the plurality of pixels in the first image has a corresponding pixel in the second image;

performing a multi-resolution decomposition of the second image to generate a second multi-level pyramid representation of the second image;

generating a level in an output multi-level pyramid representation of the scene for each level in the first and second multi-level pyramid representations of the scene, wherein generating the level comprises:

identifying, for a group of pixels in a level of the first multi-level pyramid representation of the scene, a corresponding group of pixels in the level from the second multi-level pyramid representation of the scene;

determining a weight value associated with each group of pixels in the level from the first multi-level pyramid representation of the scene and the identified corresponding group of pixels in the level from the second multi-level pyramid representation of the scene;

performing a spatial search of the level of the second multi-level pyramid representation of the scene to find a better corresponding group of pixels when the weight value is less than or equal to a specified threshold;

determining a weight value for the better corresponding group of pixels; and fusing the identified group of pixels from the first multi-level pyramid representations of the scene with the better corresponding group of pixels from the second multi-level pyramid representation of the scene when the determined weight value for the better corresponding group of pixels is greater than the specified threshold;

combining the output multi-level pyramid representations of the scene to generate a single output image representative of the scene; and storing the output image in a memory.

16. The method of claim 15, further comprising:

not fusing the identified group of pixels from the first multi-level pyramid representations of the scene with the better corresponding group of pixels from the second multi-level pyramid representation of the scene when the determined weight value for the better corresponding group of pixel is less than or equal to the specified threshold.

17. The method of claim 15, wherein determining a weight value associated with each group of pixels in the level from the first multi-level pyramid representation of the scene and the identified corresponding group of pixels in the level from the second multi-level pyramid representation of the scene comprises:

comparing a similarity between each pixel in the group of pixels in the level of the first multi-level pyramid representation of the scene and a corresponding pixel in the identified corresponding group of pixels in the level from the second multi-level pyramid representation of the scene;

obtaining a pixel similarity value based on the comparison;

obtaining an expected noise content for the group of pixels in the level of the first multi-level pyramid representation of the scene; and calculating the weight value based on the pixel similarity value and the expected noise content.

18. The method of claim 16, wherein the better corresponding group of pixels comprises a group of pixels with a weight value greater than the specified threshold.

19. The method of claim 15, wherein fusing the identified group of pixels from the first multi-level pyramid representations of the scene with the better corresponding group of pixels from the second multi-level pyramid representation comprises:

estimating a motion field for each second multi-level pyramid representation of the second image, wherein the motion field associates pixels from the first image with pixels from the second image; and fusing each pixel from the first multi-level pyramid representation with a pixel selected from the motion field.

20. The method of claim 15, wherein fusing the identified group of pixels from the first multi-level pyramid representations of the scene with the better corresponding group of pixels from the second multi-level pyramid representation comprises fusing one pixel from the first multi-level pyramid representation with two or more pixels from the better corresponding group of pixels from the second multi-level pyramid representation, wherein spatial coordinates of the two or more pixels are in a pre-determined neighborhood of an identified corresponding pixel to the one pixel in the second multi-level pyramid representation.

* * * * *

UNITED STATES PATENT AND TRADEMARK OFFICE
CERTIFICATE OF CORRECTION

PATENT NO. : 9,262,684 B2
APPLICATION NO. : 13/911740
DATED : February 16, 2016
INVENTOR(S) : Marius Tico et al.

Page 1 of 1

It is certified that error appears in the above-identified patent and that said Letters Patent is hereby corrected as shown below:

In the Specification

Column 15, lines 4-5: Insert --of-- after the phrase "determining a weight value for the better corresponding group";

Column 15, line 7: Replace the word "representations" with the word --representation--.

Signed and Sealed this
Second Day of August, 2016

Michelle K. Lee
*Director of the United States Patent and Trademark Office*